United States Patent [19]

Belser et al.

[11] Patent Number: 5,737,344
[45] Date of Patent: Apr. 7, 1998

[54] DIGITAL DATA STORAGE WITH INCREASED ROBUSTNESS AGAINST DATA LOSS

[75] Inventors: Karl Arnold Belser; Mario Blaum, both of San Jose, Calif.; John Edward Kulakowski, Tucson, Ariz.; Kurt Allen Rubin, Santa Clara, Calif.

[73] Assignee: International Business Machines Corporation, Armonk, N.Y.

[21] Appl. No.: 450,123

[22] Filed: May 25, 1995

[51] Int. Cl.[6] .......................... G11B 20/18; G06F 11/10
[52] U.S. Cl. ................. 371/40.4; 371/40.14; 395/182.04
[58] Field of Search ........................ 371/40.1, 40.4, 371/40.14; 395/182.04

[56] References Cited

U.S. PATENT DOCUMENTS

| | | | |
|---|---|---|---|
| 4,405,952 | 9/1983 | Slakmon | 360/49 |
| 4,796,110 | 1/1989 | Glass et al. | 360/53 |
| 4,912,695 | 3/1990 | Senshu | 371/40.4 |
| 4,949,326 | 8/1990 | Takagi | 369/53 |
| 4,972,316 | 11/1990 | Dixon | 364/200 |
| 5,095,485 | 3/1992 | Sato | 371/51.1 |
| 5,151,905 | 9/1992 | Yokono et al. | 371/39.1 |
| 5,157,669 | 10/1992 | Yu | 371/37.7 |
| 5,163,023 | 11/1992 | Ferris | 365/200 |
| 5,185,746 | 2/1993 | Tanaka | 371/40.1 |
| 5,233,618 | 8/1993 | Glider | 371/68.1 |
| 5,239,637 | 8/1993 | Davis | 395/425 |
| 5,241,531 | 8/1993 | Ohno | 369/275.2 |
| 5,270,877 | 12/1993 | Fukushima et al. | 360/48 |
| 5,287,478 | 2/1994 | Johnston et al. | 395/438 |
| 5,331,646 | 7/1994 | Krueger | 371/40.4 |
| 5,414,720 | 5/1995 | Kadokawa | 371/40.4 |

*Primary Examiner*—Stephen M. Baker
*Attorney, Agent, or Firm*—Baker Maxham Jester & Meador

[57] ABSTRACT

Digital data is stored on a DASD by generating a parity block for a specified block of data items and storing the parity block at a selected location on the DASD. The parity block includes a parity computation calculated by applying a parity routine to the corresponding data. The parity block also includes a parity code that indicates either (1) the size of the corresponding data block, or (2) the number of data items contributing to the parity computation. The parity block may be stored adjacent to the corresponding data, or at an independent location. Among other things, the invention provides significantly increased robustness against data loss, and improved flexibility and efficiency in storing data.

51 Claims, 6 Drawing Sheets

DIGITAL DATA STORAGE WITH INCREASED ROBUSTNESS AGAINST DATA LOSS

BACKGROUND OF THE INVENTION

1. Field of the Invention

The present invention relates to the storage of digital data on various direct access data storage media. More particularly, the invention concerns a method and apparatus to generate a parity block for data to be stored, and store the data and the parity block at selected locations on the data storage media. This significantly increases the robustness of the data against loss.

2. Description of the Related Art

Parity schemes are used in a variety of applications. Parity information commonly follows digital data transmitted over a telephone line, for example. Parity is also used in applications using redundant arrays of inexpensive disks ("RAIDs"). Occasionally, parity has even been used in read-only optical media, along with error checking and correction techniques.

"Parity" refers to the computation of digital parity information based on digital data, where the parity information can be used to assist with the error-free transmission of the digital data, or to reconstruct the digital data if part of it is somehow lost.

Although parity is typically used to transmit data through modems and the like, computers also employ various parity schemes to store digital data on magnetic digital data storage disks. In these systems, the parity sectors typically lie on different physical surfaces and/or different disk drives from the data sectors, and there is some fixed relationship between the locations of the data and parity sectors.

Computers have also been known to employ parity with optical data storage media. This is often necessary, however, since many optical disks are housed by protective cases that help avoid damage or contamination of the optical disk. Nonetheless, many optical disks are now being developed without protective casings. Like music compact disks ("CDs"), these unprotected optical disks are subject to contamination such as dust, spills, or fingerprints, as well as mechanical damage such as scratches or nicks. Additionally, as the storage capacity of optical disks advances beyond the millions of bytes, the likelihood is significant that one or more of these bytes will be defective.

FIG. 1 illustrates one known application of parity, which involves read-only memory ("ROM"). This application uses a group 100 of fixed-length data sectors 101, each data sector 101 having multiple bytes 102. One parity sector 104, having a number of bytes 106 equal in number to the bytes 102, is computed for the group 100 of data sectors. Specifically, each byte 106 of the parity sector 104 is computed by applying a parity formula to corresponding bytes from each data sector 101 of the group 100 associated with the parity sector 104. Each parity sector 104 and its associated data sectors 100 may be referred to as a logical track.

The application shown in FIG. 1 also uses error correction and control ("ECC"), in conjunction with parity. An ECC algorithm is applied to each data sector 101 to generate a corresponding ECC syndrome 108. Usually, the ECC algorithm involves computations with a designated polynomial. An ECC syndrome 110 is also generated based upon the parity sector 104. Each ECC syndrome can be processed by an ECC algorithm to specifically identify erroneous bytes in the associated data sector. If the ECC mechanism is not successful in correcting a defective data sector 101, the parity sector 104 can be used to reconstruct a failed data sector by using information from the non-defective data sectors.

Although this approach has proven useful in many applications, some users would benefit from greater flexibility in storing data and calculating parity. For instance, some logical tracks may contain less data than their capacity. A logical track of 17 sectors, for instance, might only contain 2 sectors of data in some cases. In this case, the remaining area includes a small amount of parity and ECC information, along with a significant portion of unused space. In addition to the problem with empty space, parity computation with this approach is unnecessarily complicated. Specifically, parity is calculated based on all data sectors, even though a significant number may be empty, as mentioned above. It would therefore be desirable to have a scheme for calculating and storing parity with greater efficiency.

SUMMARY OF THE INVENTION

Broadly, the present invention concerns a method for storing digital data on a direct access data storage device ("DASD") by generating a parity block for a specified block of data items and storing the parity block at a selected DASD location, which may be separate from the DASD location where the data items are stored. In addition to the parity computation based on the corresponding block of data items, the parity block includes a parity code that indicates either (1) the size of the corresponding data, or (2) the number of data items contributing to the parity computation. The parity block may be stored adjacent to the corresponding data, or at an independent location. In one embodiment, each sector may include a reserved location to identify that sector as a data or a parity sector.

The present invention may also be embodied in various hardware components. For example, the invention may comprise a drive controller programmed to perform the method described herein, or a disk storage media tangibly embodying a program of instructions executable by a digital processor to carry out such method steps.

The invention affords its users with a number of distinct advantages. For example, the invention stores digital data with significantly increased robustness against data loss. This is achieved by generating a separate parity block for each block of data items, and storing each parity block apart from the data. Additionally, the invention provides flexibility in storing data, because the parity block includes a parity code indicating the number and/or location of data items that have contributed to the parity block. As a result, the parity block of the invention can accurately represent a data block with non-contributing data items, or a block of data having truncated size.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Broadly, the present invention concerns a method and apparatus useful to store digital data on a DASD. DASDs may include, for example, floppy diskettes, rigid diskettes, hard disk drives, optical disks, "floptical" disks, random access memory, or other data storage devices that provide direct access to stored data. The invention generates a "parity block" for a data block that comprises a number of individual data "items" such as sectors. The parity block is stored at a selected location on the data storage media. Preferably, there is no a priori requirement that any sector of the DASD be specifically designated in advance for storage of data or parity. The parity block includes a parity "computation" based on the corresponding data, as well as a special parity "code". The parity code is stored adjacent to the corresponding data, or at an independent location, and serves to indicate (1) the size of the corresponding data, or (2) the number of data items contributing to the parity computation. Each data item, as well as the parity block, may contain a flag or other identifier to indicate whether that region of the DASD contains parity or data.

Drive Controller

Figure 1:
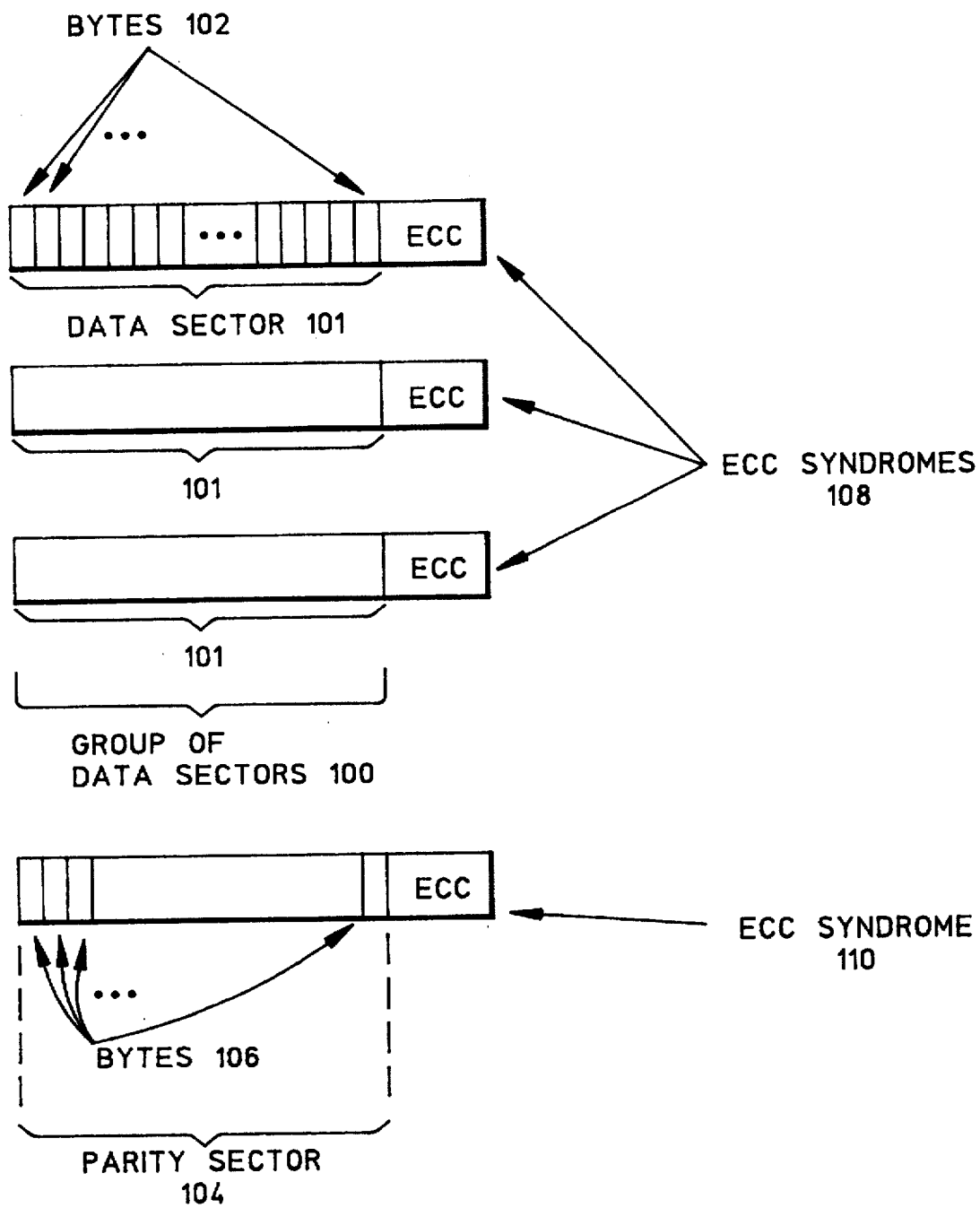
FIG. 1 is a diagram of a known parity storage scheme found in some existing ROMs.
Figure 2:
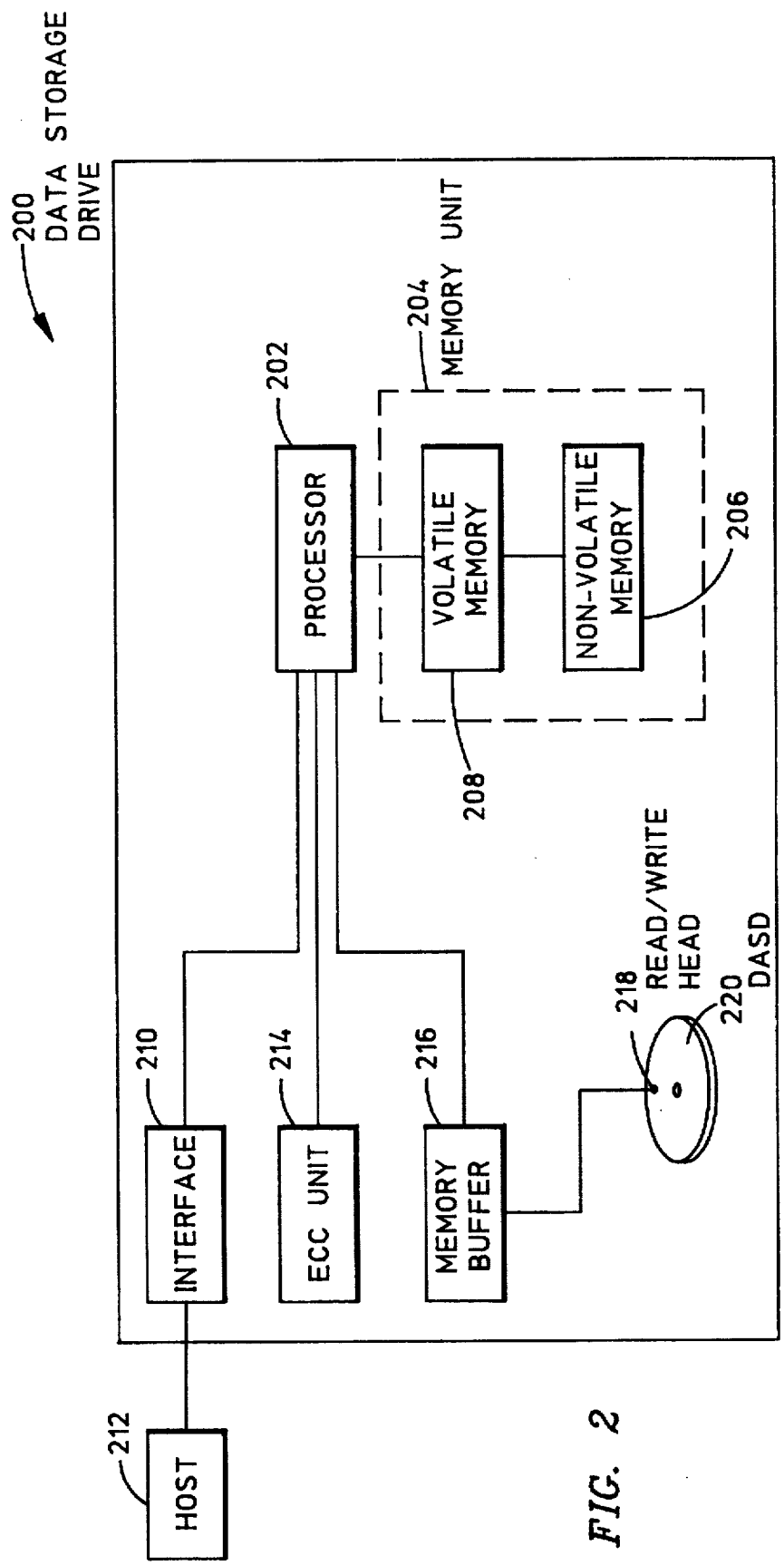
FIG. 2 is a block diagram of the hardware components and interconnections of a data storage drive pursuant to one embodiment of the invention.

The present invention may be implemented using a data storage drive 200 (FIG. 2), which is programmed to perform certain method steps described in greater detail below. The drive 200 includes a processor 202, such as a microprocessor, connected to a memory unit 204. The memory unit 204 may comprise, for example, a non-volatile memory 206 (such as ROM), and a volatile memory 208 (such as RAM).

The processor 202 is additionally connected to an interface 210, which exchanges electrical signals between the processor 202 and a host 212. The interface 210 may comprise, for instance, a SCSI type interface. The processor 202 may also be connected to an ECC unit 214, if desired for additional error control. The ECC unit 214 comprises circuitry for error checking and correction, which may operate in accordance with a known technique such as Reed-Solomon. The processor 202 is further connected to a memory buffer 216, which exchanges electrical signals with a direct access data storage medium 220 via a read/write head 218.

The DASD 220 may comprise a number of different direct access storage media, such as a magnetic digital data storage device, including floppy diskettes, rigid diskettes, hard drives, and the like. Alternatively, the DASD 200 may comprise an optical data storage media, such as a 90 mm, 120 mm, or 130 mm optical disk, or a floptical disk. The DASD 220, whether magnetic or optical or otherwise, may comprise read-only, write-once, or re-writable media.

Program Storage on DASD

Figure 3:
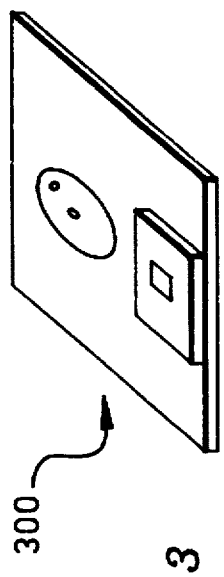
FIG. 3 is a perspective view of a data storage medium pursuant to one embodiment of the invention.

The functions of the invention may be carried out, for example, by using the processor 202 (FIG. 2) to execute a program of machine-readable instructions. These instructions may reside, for example, in the non-volatile memory 206, in the volatile memory 208, or both. Alternatively, the instructions may be contained on another data storage medium, such as a computer diskette 300 (FIG. 3), which is read by the processor 202. Or, the instructions may also be stored on a DASD array, magnetic tape, conventional "hard drive", electronic read-only memory, optical storage device, paper "punch" cards, or another suitable data storage device.

Fixed-Length Storage Method

In addition to the hardware aspects of the invention, the invention also contemplates various methods for storing, reading, and recovering data. One embodiment, for example, is the fixed-length storage method, depicted in FIG. 4. In the fixed-length storage method, one parity block 400 is associated with each data block 402. Each data block 402 includes the same number of fixed-size data items 409, and therefore has the same overall size. The parity block 400 has the same size as one data item 409. As ma example, each data item 409 may comprise a sector, where the data block 402 comprises 16 sectors and the parity block 400 comprises one sector. Thus, each time 16 sectors of data are stored on the DASD, a one sector parity block is generated and stored. Each sector, for example, may contain 512 or 1024 bytes.

The parity block 400 includes a parity computation 403, which is formed by applying a parity routine to the data items 409 associated with the parity block 400. Preferably, the parity computation 403 is formed by computing the exclusive-or ("XOR") of corresponding bits from each of the data items 409 associated with the parity block 400. In addition to the parity computation 403, the parity block 400 includes a parity code 404 associated with the data block 402. The parity code 404 may be contained in certain "overhead" bytes that may accompany the parity block 400, such as "DMP" bytes. In one embodiment, the parity code 404 includes a parity flag 406 of one or more bytes, and a single- or multi-byte parity bit map 408 ("parity map"). The flag 406 contains a signal that identifies the region of the DASD occupied by the parity block 400 as containing parity rather than data. In this regard, each of the data items 409 may also contain a flag (not shown) identifying the region of the DASD occupied by the data item as containing data rather than parity.

The parity map 408 performs an important function of the invention by identifying each of the data items 409 that contributed to the parity computation 403. For example, if the data items 1–10 contain data but data items 11–16 are empty, the parity map 408 signifies that the parity computation 403 was computed using bits from data items 1–10. As another example, if the data items 1, 5, 7–10, and 16 contain data but the data items 2–4, 6, and 11–15 are empty, the bit map 408 signifies that the parity computation 403 was computed using bits from data items 1, 5, 7–10, and 16. As an alternative to using flags in data items and the parity block, the parity map 408 may identify the parity block 400 as such; in this embodiment, the parity flag 406 (and any flags in the individual data items) may be eliminated.

Although the parity block 400 may be stored on the DASD immediately after the data block 402, data recovery is enhanced by positioning the parity block 400 apart from the data block 402. This prevents any regional damage or contamination of the data block 402 from affecting the remotely located parity block 400. In this case, the parity map 408 also provides the address of the data block 402.

For both re-writable and WORM medias, the fixed-length storage method is especially advantageous in applications that generate a large number of long transfer units, due to the high storage efficiency and good performance characteristic of this method.

Variable-Length Storage Method

Figure 5:
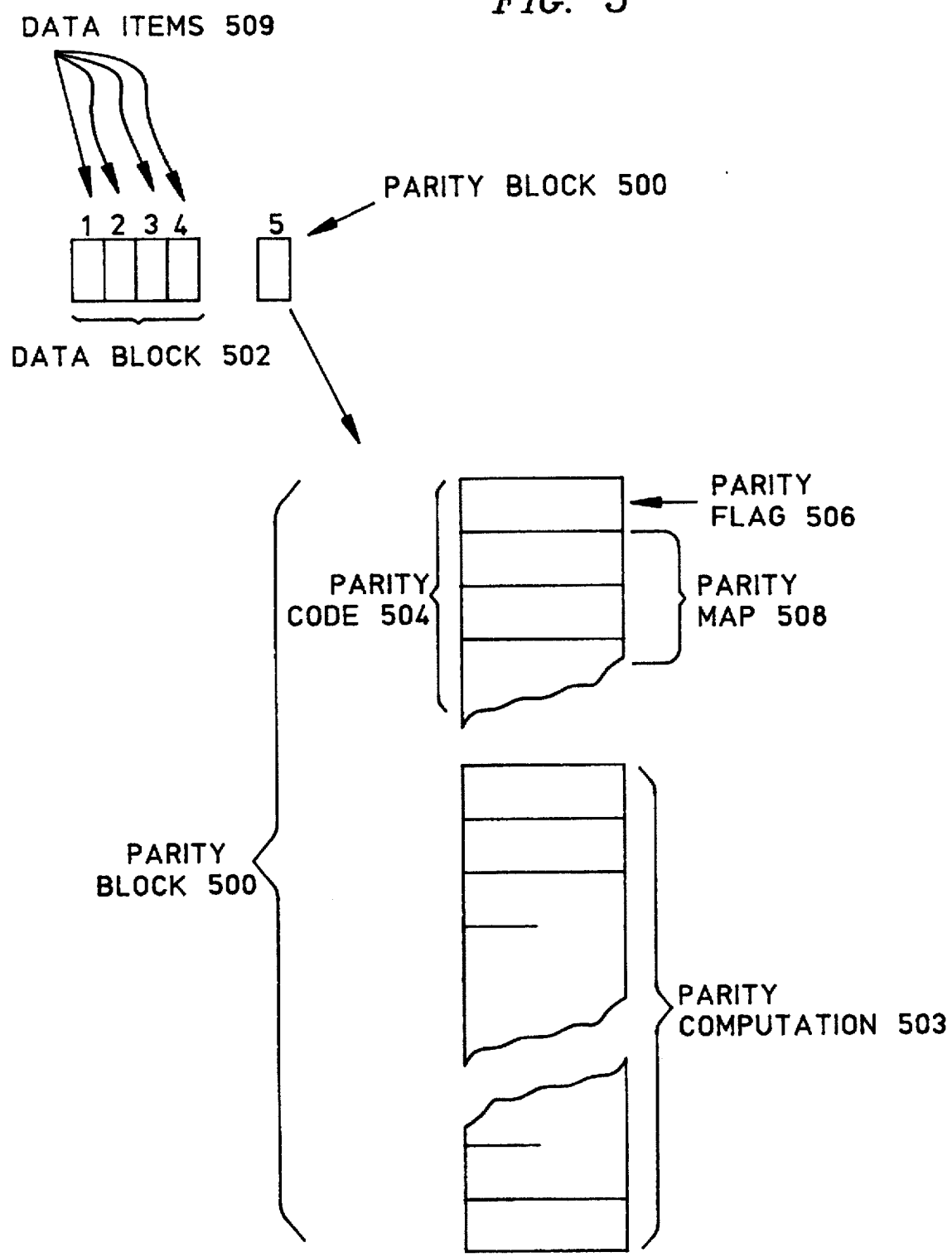
FIG. 5 is a block diagram depicting a configuration of data and parity storage pursuant to a variable-length storage embodiment of the invention.

Another method of storing data involves variable-length data blocks, as shown in FIG. 5. In the variable-length storage method, one parity block 500 is associated with each data block 502. Although each data item 509 has the same fixed-size, each data block 502 may be of a different size than other data blocks. In the illustrated example, the data block 502 comprises four data items 509, with a maximum of 16 data items. The parity block 500 has the same size as one data item. A data item (and therefore a parity block) may, for example, occupy one sector. Each time a block of data is written to the DASD, a parity block 500 is generated and stored.

Figure 4:
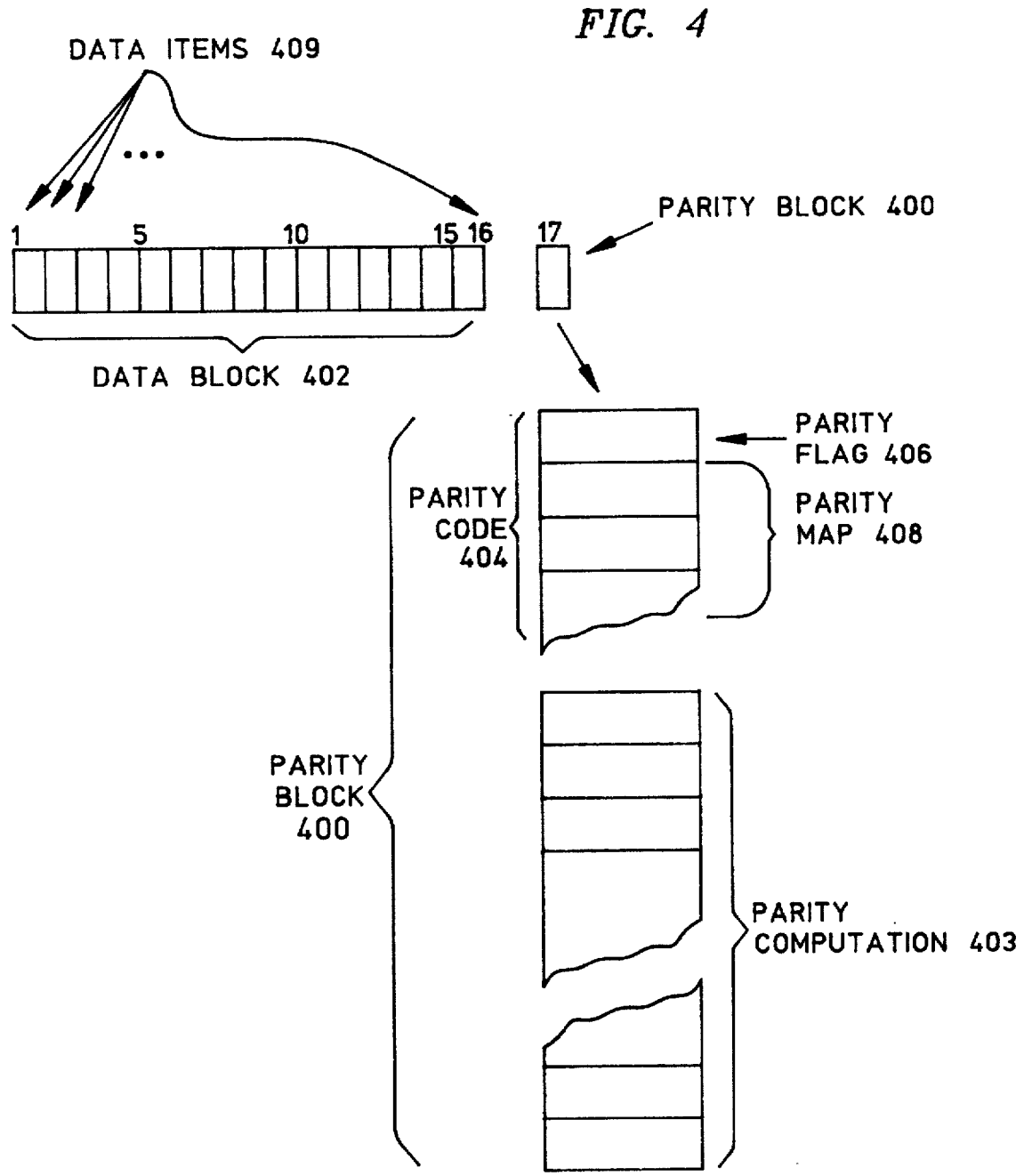
FIG. 4 is a block diagram depicting a configuration of data and parity storage pursuant to a fixed-length storage embodiment of the invention.

The parity block 500 includes a number of components similar to those of FIG. 4. For example, the parity block 500 includes a parity computation 503 (similar to the parity computation 403, FIG. 4), and a parity code 504 (similar to the parity code 404, FIG. 4) with a parity flag 506 and a parity map 508. In this regard, each of the data items 503 may also contain a flag (not shown) identifying the region occupied by the data item as containing data rather than parity information.

However, rather that indicating which data items 509 contributed to the parity computation 503, the parity map 508 provides a count of how many data items contributed to the parity block 503. Therefore, all data items 509 contribute to the parity computation 503, and the parity map 508 indicates the length of the data block 502. In the illustrated example, the parity map 508 indicates that the parity computation 503 was computed using bits from data items 1-5. As an alternative to using flags in the data items and parity block, the parity map 508 may identify the parity block 500 as such; in this embodiment, the parity flag 506 (and any flags in the individual data items) may be eliminated.

As with the parity block 400, the parity block 500 may be advantageously positioned apart from the data block 502, to enhance data recovery. In this case, the parity map 508 also provides the address of the data block 502.

The variable-length storage method is especially advantageous for use with ROM and WORM media since re-writing of data on these types of media is inconvenient or impossible. The variable-length method, however, ensures that storage is efficiently used. Rather than storing data sectors that would otherwise be empty, for instance, these the size of the overall data block is simply decreased. Data can therefore be stored more compactly.

Exemplary Sequences of Method Steps

Figure 6:
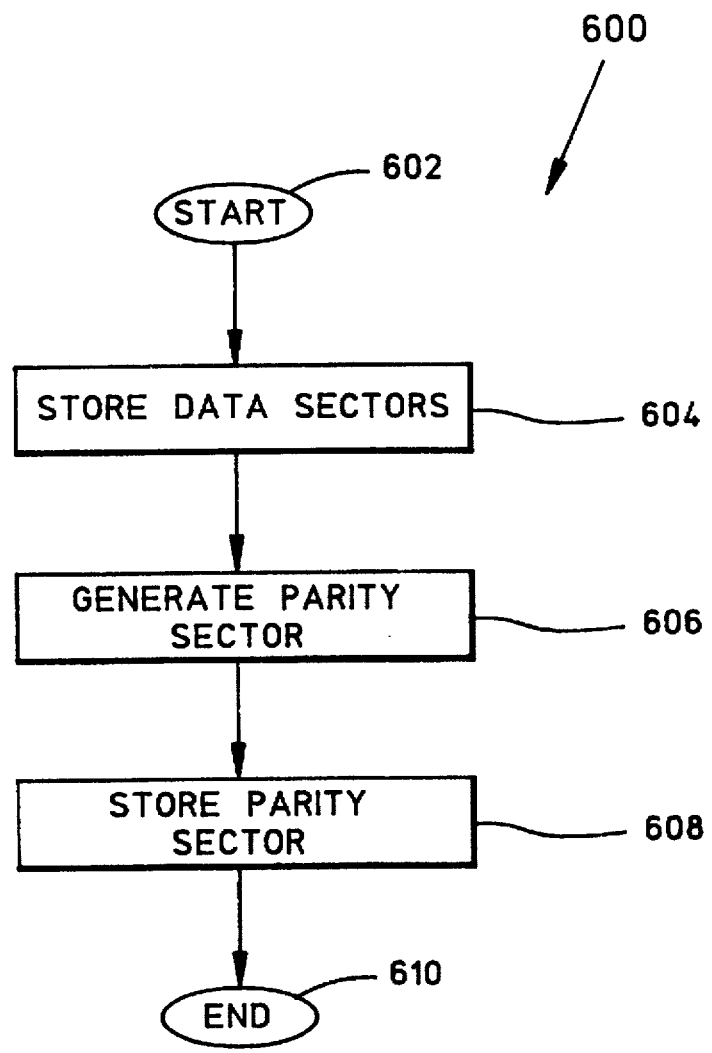
FIG. 6 is a flowchart depicting an exemplary sequence of tasks for storing data in accordance with the present invention.

To further illustrate the method aspect of the invention, FIG. 6 depicts an exemplary sequence of tasks 600. The tasks 600 may be performed by the processor of a data storage drive, a host computer, or another digital data processor as discussed above, to implement a data storage process such as the fixed-length or the variable-length storage method. For illustrative purposes, the present example is described in the context of the data storage drive 200, where the routine 600 is performed by the processor 202. The processor 202 executes the routine 600 one time for each data block to be stored.

Specifically, when the processor 202 desires to store a data block, the processor 202 starts the routine 600 at task 602. Then, in task 604, the processor 202 directs the read/write head 218 to store the desired data block to the DASD 220. The data block may comprise a fixed-length data block, as described in FIG. 4, or a variable-length data block, as described in FIG. 5.

After task 604, the processor 202 generates a parity block corresponding to the stored data block (task 606), and then stores the parity block on the DASD 220 (task 608). The parity block may be stored immediately following the data block, or at a separate location instead. Finally, after the data and parity blocks have been stored, the routine 600 ends in task 610.

Figure 7:
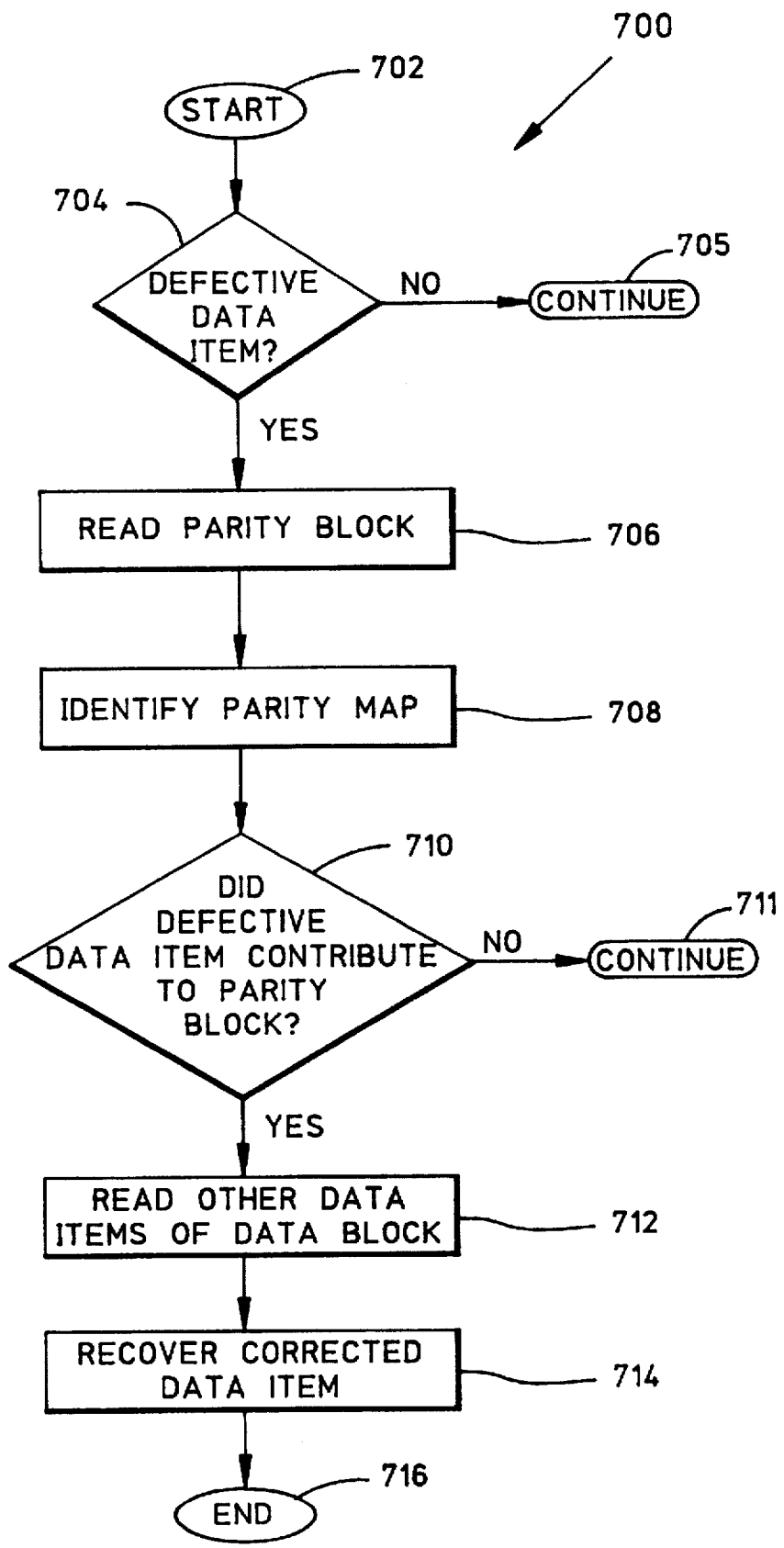
FIG. 7 is a flowchart depicting an exemplary sequence of tasks for recovering failed data in accordance with the invention.

FIG. 7 illustrates an exemplary sequence of tasks 700 to recover data stored in accordance with the method of FIG. 6. The tasks 700, like the tasks 600, may be performed by a processor or other hardware device such as discussed above. For illustrative purposes, the present example is described in the context of the data storage drive 200, where the routine 700 is performed by the processor 202.

The routine 700 is performed after the processor 202 reads an item of data. Specifically, after the processor 202 reads the data item, the processor 202 starts the routine 700 at task 702. Query 704 then asks whether the data item (just read) is defective. If not, the processor 202 in task 705 continues reading and processing data. If query 704 finds the data item to be defective, however, task 706 reads the parity block associated with the data block containing the defective data item. Next, task 708 identifies the parity map of the identified parity block. Query 710 then asks whether defective data item contributed to the parity block's parity computation. If not, the processor 202 in task 711 continues reading and processing data. If the parity computation does depend on the defective data item, however, the processor 202 in task 712 reads the other data items of the same data block. If the fixed-length storage method was used, for example, the parity computation will be independent of any non-contributing data items. After task 712, the processor 202 in task 714 recovers corrected data from the defective sector using the parity computation and the remaining (non-defective) data items of the data block. This operation may be performed, for example, by performing a logical operation (such as XOR) upon the parity computation and remaining data items. After task 714, the routine 700 ends in task 716.

Other Embodiments

While there have been shown what are presently considered to be preferred embodiments of the invention, it will be apparent to those skilled in the art that various changes and modifications can be made herein without departing from the scope of the invention as defined by the appended claims. As one example, the invention may use different sizes of data and parity blocks than those disclosed.

Furthermore, data integrity may be further enhanced by employing the techniques of ECC in addition to the parity computation and storage approach of the present invention. As an example, the ECC may be used primarily in recovering lost data; should the ECC be inadequate, the parity sectors may be employed as a secondary measure to recover lost data.

As another alternative, the parity block may be sized larger than a single data item to further increase data robustness. For instance, the parity block may include two or more parity computations, where each parity computation is based upon a separate group of data items, which may be interleaved with the data items associated with the other parity computations. In accordance with the present invention, the parity may be computed and managed as taught by the following references, which are incorporated by reference in their entirety: (1) M. Blaum et al., "A Coding Technique for Double Disk Failures in Disk Arrays," U.S. Pat. No. 5,271,012, and (2) M. Blaum et al., "Method and Means for Coding and Rebuilding the Data Contents of Unavailable DASDs or Rebuilding the Contents of a DASD in Error in the Presence of a Reduced Number of Unavailable DASDs in a DASD Array," U.S. Pat. No. 5,321,246.

What is claimed is:

1. A method for storing digital data with increased robustness against data loss, comprising the steps of:
   storing a first predetermined number of data items in selected positions of a contiguous block of a data storage medium, said contiguous block having a second predetermined number of positions at least as large in number as the first predetermined number;
   generating a parity block by performing steps comprising:
      applying a parity routine to the first predetermined number of data items to form a parity computation;
      forming a parity map representative of the selected positions in which the first predetermined number of data items are stored; and
   storing the parity block on the data storage medium.

2. The method of claim 1, wherein each data item comprises one sector.

3. The method of claim 1, wherein each block position corresponds to a different data sector.

4. The method of claim 1, wherein the step of storing the parity block comprises the step of storing the parity block immediately following the data items.

5. The method of claim 1, wherein the step of storing the parity block comprises the step of storing the parity block separate from the data items.

6. The method of claim 1, wherein the parity block includes a flag to distinguish the parity block from a data item.

7. The method of claim 1, wherein the parity map contains a flag to distinguish the parity block from a data item.

8. The method of claim 1, further comprising the steps of:
   reading a defective one of the first predetermined data items;
   recognizing the defective data item as being defective;
   locating the parity block associated with the defective data item;
   reading the parity block and all non-defective data items of the first predetermined number of data items; and
   using the parity block and the non-defective data items to reconstruct the defective data item.

9. A method for storing digital data with increased robustness against data loss, comprising the steps of:
   storing a first number of data items in consecutive positions on a data storage medium;
   generating a parity computation by applying a parity computation routine to the first number of data items;
   generating a parity map representative of the first number of data items; and
   storing the parity computation and parity map on the data storage medium.

10. The method of claim 9, wherein each data item comprises one sector.

11. The method of claim 9, wherein the parity computation and parity map are stored or the data storage medium following the data items.

12. The method of claim 9, wherein the parity computation and parity map are stored on the data storage medium separate from the data items.

13. The method of claim 9, wherein the parity computation is stored in a parity block that includes a flag to distinguish the parity block from a data item.

14. The method of claim 9, wherein the parity map is stored in a parity block that contains a flag to distinguish the parity block from a data item.

15. The method of claim 9, further comprising the steps of:
   reading a defective one of the first predetermined data items;
   recognizing the defective data item as being defective;
   locating the parity computation associated with the defective data item;
   reading the parity computation and all non-defective data items of the first predetermined number of data items; and
   using the parity computation and the non-defective data items to reconstruct the defective data item.

16. A data storage medium tangibly embodying a program of instructions executable by a digital processor to perform method steps to store digital data with increased robustness against data loss, said method steps comprising:
   storing a first predetermined number of data items in selected positions of a contiguous block of a data storage medium, said contiguous block having a second predetermined number of positions at least as large in number as the first predetermined number;
   generating a parity computation by applying a parity computation routine to the first predetermined number of data items;
   generating a parity map representative of the selected positions in which the first predetermined number of data items are stored; and
   storing the parity computation and parity map on the data storage medium.

17. The data storage medium of claim 16, wherein each data item comprises one sector.

18. The data storage medium of claim 16, wherein each block position corresponds to a different data sector.

19. The data storage medium of claim 16, wherein the step of storing the parity computation and parity map comprises the step of storing the parity computation and parity map immediately following the data items.

20. The data storage medium of claim 16, wherein the step of storing the parity computation and parity map comprises the step of storing the parity computation and parity map separate from the data items.

21. The data storage medium of claim 16, wherein the parity computation is stored in a parity block that includes a flag to distinguish the parity block from a data item.

22. The data storage medium of claim 16, wherein the parity map is stored in a parity block that contains a flag to distinguish the parity block from a data item.

23. The data storage medium of claim 16, further comprising the steps of:
   reading a defective one of the first predetermined data items;

recognizing the defective data item as being defective;

locating the parity computation associated with the defective data item;

reading the parity computation and all non-defective data items of the first predetermined number of data items; and using the parity computation and the non-defective data items to reconstruct the defective data item.

24. A data storage medium tangibly embodying a program of instructions executable by a digital processor to perform method steps to store digital data with increased robustness against data loss, said method steps comprising:

storing a first number of data items in consecutive positions on a data storage medium;

generating a parity computation by applying a parity computation routine to the first number of data items;

generating a parity map representative of the first number of data items; and storing the parity computation and parity map on the data storage medium.

25. The data storage medium of claim 24, wherein each data item comprises one sector.

26. The data storage medium of claim 25, wherein the parity computation and parity map are stored on the data storage medium following the data items.

27. The data storage medium of claim 26, wherein the parity computation and parity map are stored on the data storage medium separate from the data items.

28. The data storage media of claim 24, wherein the parity computation is stored in a parity block that includes a flag to distinguish the parity block from a data items.

29. The data storage media of claim 24, wherein the parity map is stored in a parity block that contains a flag to distinguish the parity block from a data items.

30. The data storage media of claim 24, further comprising the steps of:

reading a defective one of the first predetermined data items;

recognizing the defective data item as being defective;

locating the parity computation associated with the defective data item;

reading the parity computation and all non-defective data items of the first predetermined number of data items; and using the parity computation and the non-defective data items to reconstruct the defective data item.

31. A data storage drive, comprising:

a read/write unit to selectively read data from and write data to a data storage medium coupled to the data storage drive; and a data controller, comprising:
 an interface connected to a host;
 a buffer connected to the read/write unit;
 a processor connected to the interface, the buffer, and the read/write unit, and programmed to perform method steps for storing digital data received from the host via the interface on the data storage medium with increased robustness against data loss, said method steps comprising:
  storing a first predetermined number of data items in selected positions of a contiguous block of a data storage medium, said contiguous block having a second predetermined number of positions at least as large in number as the first predetermined number;

generating a parity computation by applying a parity routine to the first predetermined number of data items;

generating a parity map representative of the selected positions in which the first predetermined number of data items are stored; and storing the parity computation and parity map on the data storage medium.

32. The data storage drive of claim 31, wherein each data item comprises one sector.

33. The data storage drive of claim 31, wherein each block position corresponds to a different data sector.

34. The data storage drive of claim 31, the processor being programmed such that the step of storing the parity computation and parity map stores the parity computation and the parity immediately following the data items.

35. The data storage drive of claim 31, the processor being programmed such that the step of storing the parity computation and parity map stores at least one of the parity computation and parity map separate from the data items.

36. The data storage drive of claim 31, wherein the parity computation is stored in a parity block that includes a flag to distinguish the parity block from a data item.

37. The data storage drive of claim 31, wherein the parity map is stored in a parity block that contains a flag to distinguish the parity block from a data item.

38. The data storage drive of claim 31, wherein the processor is programmed such that the method steps further comprise the steps of:

reading a defective one of the first predetermined data items;

recognizing the defective data item as being defective;

locating the parity computation and parity map associated with the defective data item;

reading the parity computation and parity map and all non-defective data items of the first predetermined number of data items; and using the parity computation and the parity map and the non-defective data items to reconstruct the defective data item.

39. A data storage drive, comprising:

a read/write unit to selectively read data from and write data to a data storage medium coupled to the data storage drive; and a data controller, comprising:
 an interface connected to a host;
 a buffer connected to the read/write unit;
 a processor connected to the interface, the buffer, and the read/write unit, and programmed to perform method steps for storing digital data received from the host via the interface on the data storage medium with increased robustness against data loss, said method steps comprising:
  storing a first number of data items in consecutive positions on a data storage medium;
  generating a parity computation by applying a parity routine to the first number of data items;
  generating a parity map representative of the first number of data items; and
  storing the parity computation and parity map on the data storage medium.

40. The data storage drive of claim 39, wherein each data item comprises one sector.

41. The data storage drive of claim 39, the processor being programmed such that the step of storing the parity computation and parity map stores the parity computation and parity map immediately following the data items.

42. The method of claim 39, the processor being programmed such that the step of storing the parity computation and parity map stores at least one of the parity computation and parity map separate from the data items.

43. The data storage drive of claim 39, wherein the parity computation is stored in a parity block that includes a flag to distinguish the parity block from a data item.

44. The data storage drive of claim 39, wherein the parity map is stored in a parity block that contains a flag to distinguish the parity block from a data item.

45. The data storage drive of claim 39, the processor being programmed such that the method steps further comprise the steps of:
- reading a defective one of the first predetermined data items;
- recognizing the defective data item as being defective;
- locating the parity computation associated with the defective data item;
- reading the parity computation and all non-defective data items of the first predetermined number of data items; and
- using the parity computation and the non-defective data items to reconstruct the defective data item.

46. A method for storing digital data with increased robustness against data loss, comprising the steps of:
- providing a plurality of data blocks each having a first predetermined number of contiguous positions, said plurality of data blocks including first and second data blocks;
- storing a second number of data items in selected positions of the first data block with the remaining positions of the first data block being free from data;
- storing a third number of data items in selected positions of the second data block with the remaining positions of the second data block being free from data, wherein the third number differs from the second number; and
- for each data block, generating a corresponding parity block by performing steps comprising:
  - forming a parity computation by applying a parity routine only to contents of positions of the data block containing data items; and
  - forming a parity map representative of the selected positions of the data block in which the data items are stored;
- storing each parity block on the data storage medium.

47. A data storage medium tangibly embodying a program of instructions executable by a digital processor to perform method steps to store digital data with increased robustness against data loss, said method steps comprising:
- providing a plurality of data blocks each having a first predetermined number of contiguous positions, said plurality of data blocks including first and second data blocks;
- storing a second number of data items in selected positions of the first data block with the remaining positions of the first data block being free from data;
- storing a third number of data items in selected positions of the second data block with the remaining positions of the second data block being free from data, wherein the third number differs from the second number; and
- for each data block, generating a corresponding parity block by performing steps comprising:
  - forming a parity computation by applying a parity routine only to contents of positions of the data block containing data items; and
  - forming a parity map representative of the selected positions of the data block in which the data items are stored;
- storing each parity block on the data storage medium.

48. A data storage drive, comprising:
- a read/write unit to selectively read data from and write data to a data storage medium coupled to the data storage drive; and
- a data controller, comprising:
  - an interface connected to a host;
  - a buffer connected to the read/write unit;
  - a processor connected to the interface, the buffer, and the read/write unit, and programmed to perform method steps for storing digital data received from the host via the interface on the data storage medium with increased robustness against data loss, said method steps comprising:
    - providing a plurality of data blocks each having a first predetermined number of contiguous positions, said plurality of data blocks including first and second data blocks;
    - storing a second number of data items in selected positions of the first data block with the remaining positions of the first data block being free from data;
    - storing a third number of data items in selected positions of the second data block with the remaining positions of the second data block being free from data, wherein the third number differs from the second number; and
    - for each data block, generating a corresponding parity block by performing steps comprising:
      - forming a parity computation by applying a parity routine only to contents of positions of the data block containing data items; and
      - forming a parity map representative of the selected positions of the data block in which the data items are stored;
    - storing each parity block on the data storage medium.

49. A method for storing digital data with increased robustness against data loss, comprising the steps of:
- storing a first data block comprising first number of data items by storing the data items in consecutive positions on a data storage medium;
- storing a second data block comprising a second number of data items by storing the data items in consecutive positions on the data storage medium, the second number being different than the first number; and
- for each data block, generating a corresponding parity block by performing steps comprising:
  - generating a parity computation by applying a parity computation routine to the data items of the data block; and
  - generating a parity map representative of the number of data items of the data block; and
- storing each parity block on the data storage medium.

50. A data storage medium tangibly embodying a program of instructions executable by a digital processor to perform method steps to store digital data with increased robustness against data loss, said method steps comprising:
- storing a first data block comprising first number of data items by storing the data items in consecutive positions on a data storage medium;
- storing a second data block comprising a second number of data items by storing the data items in consecutive positions on the data storage medium, the second number being different than the first number; and for each data block, generating a corresponding parity block by performing steps comprising:

generating a parity computation by applying a parity computation routine to the data items of the data block; and generating a parity map representative of the number of data items of the data block; and storing each parity block on the data storage medium.

51. A data storage drive, comprising:

a read/write unit to selectively read data from and write data to a data storage medium coupled to the data storage drive; and a data controller, comprising:

an interface connected to a host;

a buffer connected to the read/write unit;

a processor connected to the interface, the buffer, and the read/write unit, and programmed to perform method steps for storing digital data received from the host via the interface on the data storage medium with increased robustness against data loss, said method steps comprising:

storing a first data block comprising first number of data items by storing the data items in consecutive positions on a data storage medium;

storing a second data block comprising a second number of data items by storing the data items in consecutive positions on the data storage medium, the second number being different than the first number; and for each data block, generating a corresponding parity block by performing steps comprising:

generating a parity computation by applying a parity computation routine to the data items of the data block; and generating a parity map representative of the number of data items of the data block; and storing each parity block on the data storage medium.

* * * * *

UNITED STATES PATENT AND TRADEMARK OFFICE
CERTIFICATE OF CORRECTION

PATENT NO. : 5,737,344
DATED : April 7, 1998
INVENTOR(S) : Belser et al

It is certified that error appears in the above-identified patent and that said Letters Patent is hereby corrected as shown below:

Column 11, line 1, change "The method of claim 39" to --The data storage drive of claim 39--.

Signed and Sealed this

Twenty-ninth Day of June, 1999

Attest:

Q. TODD DICKINSON

Attesting Officer        Acting Commissioner of Patents and Trademarks